Figure 5:
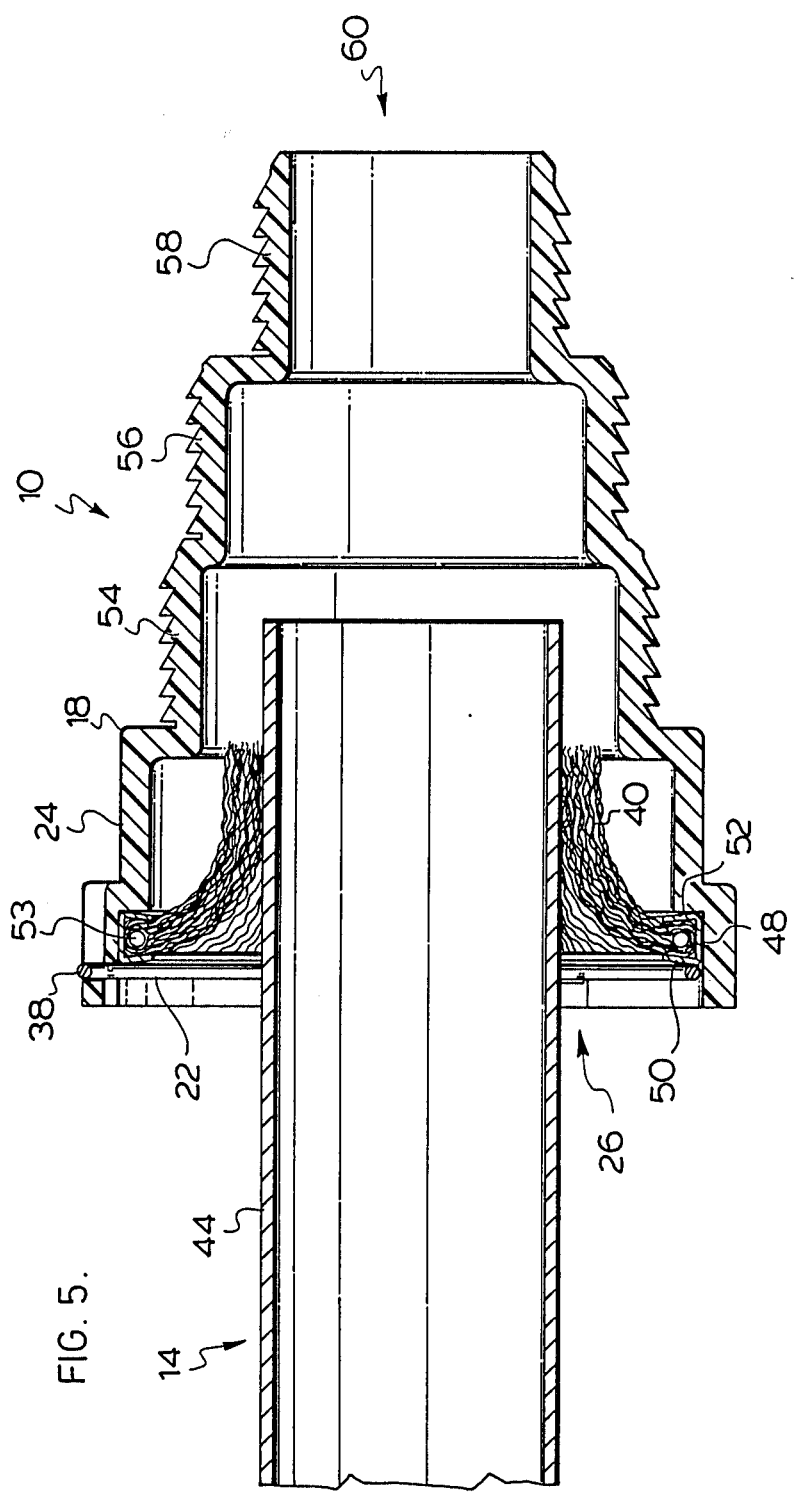

United States Patent [19]

Rich

[11] Patent Number: 4,779,904
[45] Date of Patent: Oct. 25, 1988

[54] COUPLINGS FOR CONNECTING VEHICLE EXHAUST TAIL PIPES TO EXHAUST CONDUITS FOR REMOVING VEHICLE EXHAUST GASES

[76] Inventor: Christopher K. Rich, 15 Wilson Street, Markham, Ontario L3P 1N2, Canada

[21] Appl. No.: 925,648

[22] Filed: Oct. 31, 1986

[51] Int. Cl.4 ............................................. F16L 17/00
[52] U.S. Cl. ....................................... 285/345; 285/8; 285/177; 285/910; 285/321; 277/DIG. 6
[58] Field of Search ................... 285/345, 8, 177, 910, 285/16, 17, 379, 110, 321; 277/233, 237, 47, 207 A, DIG. 6, 230, 53

[56] References Cited
U.S. PATENT DOCUMENTS 2,620,893 12/1952 Holt et al. ............................ 285/8 X
2,878,048 3/1959 Peterson ................................ 277/53
3,069,186 12/1962 Stevens ............................ 285/379 X
3,288,497 11/1966 Nydam ................................ 285/345
4,209,268 6/1980 Fujiwara et al. ................. 277/53 X
4,318,547 3/1982 Ericson ............................ 285/177 X Primary Examiner—Dave W. Arola
Attorney, Agent, or Firm—Robert F. Delbridge; Arne I. Fors

[57] ABSTRACT

A coupling for connecting a vehicle exhaust pipe to an exhaust conduit for removing vehicle exhaust gases has a cylindrical housing with an inlet at the front end and an outlet at the rear end, the rear end being connectible to an exhaust conduit. A bristle assembly is mounted within the housing adjacent the front end. The bristle assembly includes an annular container and a multitude of resilient bristles extending radially inwardly from the retainer towards the longitudinal axis of the housing and terminating at a position spaced from the longitudinal axis to provide a central aperture. The bristles project radially inwardly from the retainer by a distance in the range from about 4:1 to about 8:1 longer than the radial thickness of the retainer to enable the front end of the housing to be pushed over a vehicle exhaust tail pipe to cause the tail pipe to bend the bristles rearwardly into engagement with the tail pipe to produce an effective gas seal between the front end of the coupling and the tail pipe.

7 Claims, 3 Drawing Sheets

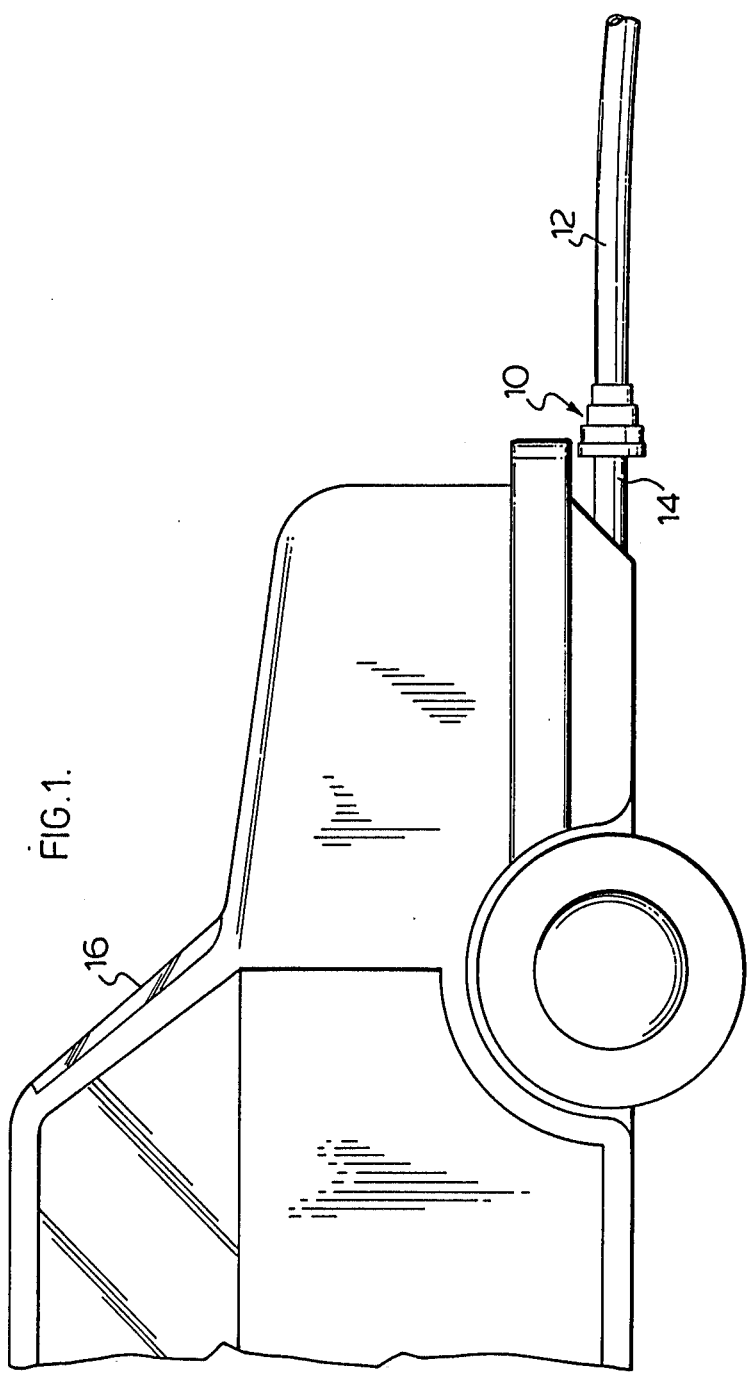

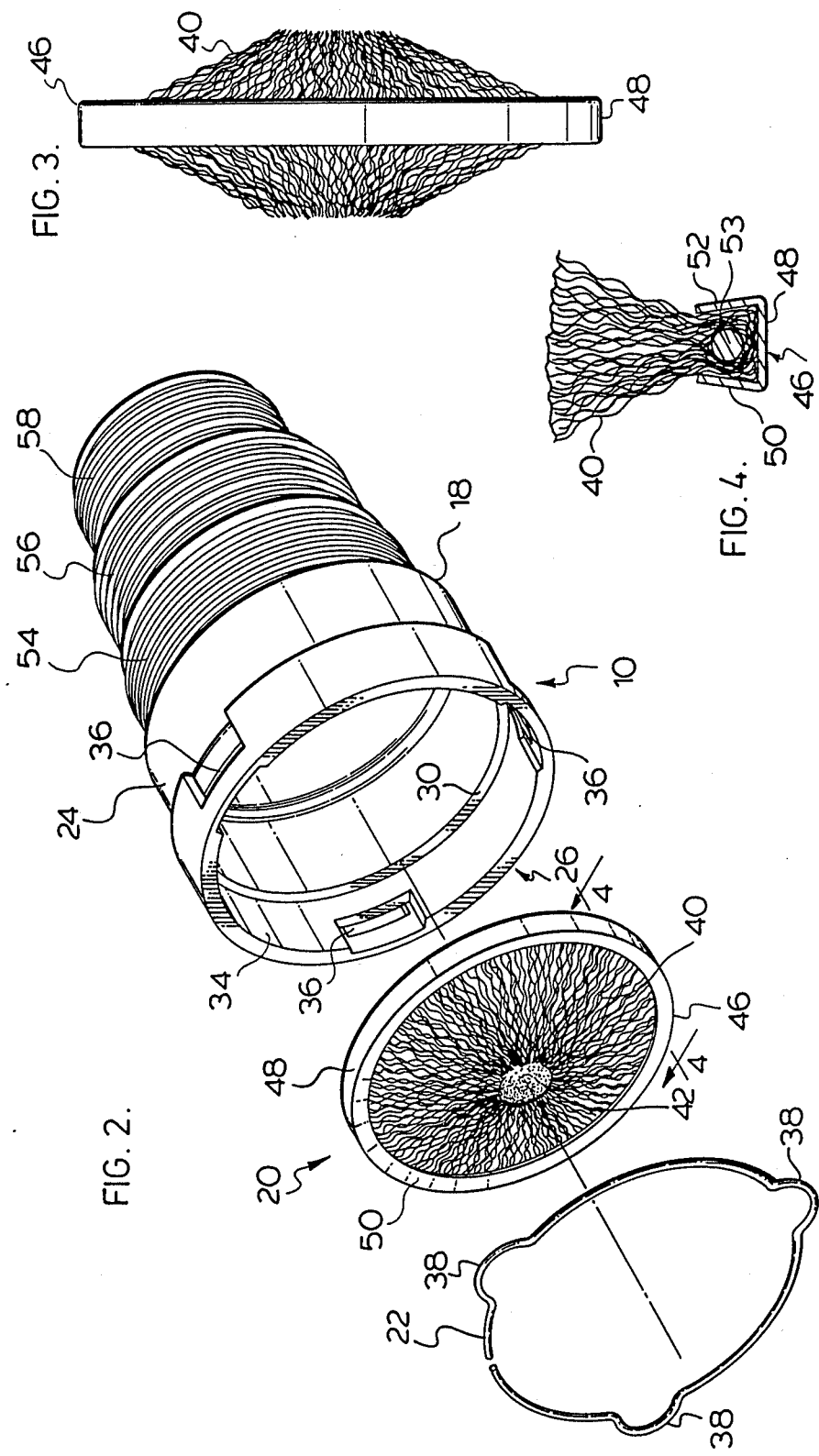

COUPLINGS FOR CONNECTING VEHICLE EXHAUST TAIL PIPES TO EXHAUST CONDUITS FOR REMOVING VEHICLE EXHAUST GASES

This invention relates to couplings for connecting vehicle exhaust pipes to exhaust conduits for removing vehicle exhaust gases.

When the engine of a vehicle is operated in an enclosed area, for example when the vehicle is being serviced or repaired in a building when weather conditions require that the door or doors of the building be closed, it is necessary to connect an exhaust conduit to the exhaust tail pipe of the vehicle to enable the exhaust gases to be conveyed by the exhaust conduit to a suitable exterior location.

In practice, tail pipes vary in diameter from one vehicle to another, and a worn tail pipe may have a jagged or corroded end. Also clearance between a tail pipe and a vehicle body may be limited. Couplings commonly in use to connect an exhaust conduit to a vehicle tail pipe do not satisfactorily cope with such eventualities, with the result that known couplings may not properly couple the tail pipe to the exhaust conduit and may consequently permit the potentially harmful leakage of exhaust gases. Further, known couplings may be damaged by attachment to damaged or relatively large diameter tail pipes.

It is therefore an object of the invention to provide an improved coupling for vehicle tail pipes which at least substantially overcomes such disadvantages of known couplings.

According to the present invention, a coupling comprises a cylindrical housing having an inlet at a front end and an outlet at a rear end, the rear end being connectible to an exhaust conduit, a bristle assembly mounted within the housing adjacent the front end, and means securing the bristle assembly in the housing. The bristle assembly comprises an annular retainer and a multitude of resilient bristles extending radially inwardly from the retainer towards a longitudinal axis of the housing and terminating at a position spaced from said longitudinal axis to provide a central aperture. The bristles project radially inwardly from the retainer by a distance in the range from about 4:1 to about 8:1 longer than the radial thickness of the retainer to enable the front end of the housing to be pushed over a vehicle exhaust tail pipe to cause the tail pipe to bend the bristles rearwardly into engagement with the tail pipe to produce an effective gas seal between the front end of the housing and the tail pipe.

The use of resiliently bendable bristles to form the seal enables the coupling to be used with tail pipes with a range of i diameters and also with damaged tail pipes without causing an undue amount of damage to the bristles. Also, the coupling can be sufficiently compact for use with vehicles where there is a limited amount of clearance between the tail pipe and the vehicle body.

The annular retainer may have an outer diameter in the range of about 3.5 to about 4", and the bristles may project inwardly from the retainer by a distance which is about 7:1 longer than the radial thickness of the retainer.

The bristle assembly and the means for retaining the bristle assembly in the housing may be readily removable and replaceable to enable a worn bristle assembly to be replaced by a new bristle assembly.

One embodiment of the invention will now be described, by way of example, with reference to the accompanying drawings:

FIG. 1 is a diagrammatic view of an exhaust conduit connected to a vehicle tail pipe by means of a coupling in accordance with the invention, FIG. 2 is an exploded view of the coupling, FIG. 3 is a side view of the bristle assembly, FIG. 4 is a fragmentary view of the bristle assembly, and FIG. 5 is a longitudinal sectional view showing the coupling attached to a vehicle tail pipe.

Referring to the drawings, FIG. 1 shows a coupling in accordance with the invention connecting the tail pipe 14 of a vehicle 16 to a flexible exhaust conduit 12 to enable exhaust gases from the vehicle to be conveyed by the conduit 12 to an appropriate remote location.

As shown in FIGS. 2-5, the coupling comprises a cylindrical housing 18 of suitable heat-resistant plastic material, a disc-like bristle assembly 20 and a resilient metal split ring 22 for securing the bristle assembly 20 in the housing 18. The housing 18 has a front portion 24 which defines an inlet 26. In this preferred embodiment, the external diameter of the housing 18 is about 4.2" and the internal diameter is about 3.7".

The front housing portion 24 has an interior forwardly-facing annular shoulder 30 spaced from the inlet 26 which provides a seating surface for the disc-like bristle assembly 20. Between the should 30 and the front end of the front housing portion 24, the front housing portion 24 has an internal annular groove 34 with three equally-angularly spaced circumferentially-extending slots 36 which extend through the housing portion 34. The split ring 22 is generally circular with three radially projecting curved portions 38. The split ring 22 is seated in the groove 34 with projections 38 engaged in slots 36 to secure the bristles assembly 20 in place in the front housing portion 24.

The bristle assembly 20 comprises an annular bristle retainer 46 of U-shaped section with a base 48 and arms 50, 52. The retainer 46 contains a split metal ring 53 which extends around the interior of the retainer 46. A large number of resilient nylon bristles 40 extend around the ring 50 within retainer 46 and project radially inwardly therefrom towards but terminating short of the centre of the retainer 46 so as to leave a central aperture 42.

It will be readily apparant to a person skilled in the art that the bristle assembly 20 can be manufactured by first folding the bristles 40 around the ring 53 with the ring in a straight condition. Then, with the retainer 46 in a straight condition with U-shaped section, the sub-assembly of the bristles 40 and the ring 53 can be pushed into the retainer 46, with the retainer sides 50, 52 then being crimped laterally inwardly towards one another to retain the ring 53 therein. The retainer 46 can then bent into an annular form and its abutting ends secured together, for example by welding. The nylon bristles 40 are preferably crimped to improve their resilience.

In this preferred embodiment, the external diameter of the retainer 46 is about 3.6", the internal diameter thereof is about 3.2", and the bristles 40 project radially inwardly from the retainer 46 for a distance of about 1.4" to provide the aperture 42 with a diameter of about 0.4". The number of bristles is such as to produce a densely packed array with their free ends bulging laterally outwardly in both directions as shown especially in FIG. 3.

The housing 18 also has a rear portion with three sections 54, 56, 58 with different diameters. Section 54 extends rearwardly and is of smaller diameter than the front housing portion 24, section 56 extends from and is of smaller diameter than section 54, and section 58 extends from and is of smaller diameter than section 56. Section 58 extends to the rear end outlet 60 of the housing 18. In this preferred embodiment, the outer diameters of the sections 54, 56 and 58 are about 3", 2.5" and 2" respectively. Thus, the rear portion of the housing 18 can accept exhaust conduits 12 of different diameters, with an exhaust conduit 12 being forced on to an appropriate one of section 54, 56, 58, which are externally ribbed as shown to assist in retention of an exhaust conduit 12 and assembly 12 therewith.

The coupling described above and illustrated in the drawings can be used with tail pipes with external diameters ranging from about 1" to about 2.75". As shown in FIG. 3, the coupling 10 is assembled with the tail pipe 14 by pushing the free end of the housing 18 over the tail pipe 14 to cause the tail pipe 14 to bend the free end portions of the bristles 14 rearwardly through angles up to 90° so that the resiliently bent bristle portions engage the external surface 44 of the tail pipe 14 in a sealing manner.

Thus, not only can the coupling 10 be used with tail pipes of different diameter, but use with jagged or otherwise damaged tail pipes does not unduly damage the bristles 40. In any event, a worn bristle assembly can readily be replaced by a new bristle assembly, since it is only necessary to remove the split ring 22 for this purpose.

Other embodiments of the invention will be readily apparent to a person skilled in the art, the scope of the invention being defined in the appended claims.

I claim:

1. A coupling for connecting a vehicle exhaust pipe to an exhaust conduit for removing vehicle exhaust gases, comprising:
   a cylindrical housing having an inlet at a front end and an outlet at a rear end, said rear end being connectible to an exhaust conduit,
   a bristle assembly removably mounted within the housing adjacent the front end, and removable means for securing the bristle assembly in the housing,
   said bristle assembly comprising an annular retainer and a multitude of resilient bristles extending radially inwardly from the retainer towards a longitudinal axis of the housing and terminating at a position spaced from said longitudinal axis to provide a central aperture,
   said bristles projecting radially inwardly from the retainer by a distance in the range from about 4:1 to about 8:1 longer than the radial thickness of the retainer to enable the front end of the housing to be pushed over a vehicle exhaust tail pipe to cause the tail pipe to bend the bristles rearwardly into engagement with the tail pipe to produce an effective gas seal between the front end of the coupling and the tail pipe.

2. A coupling according to claim 1 wherein the annular retainer has an outer diameter in the range from about 3.5 to about 4".

3. A coupling according to claim 2 wherein the bristles project radially inwardly from the retainer by a distance which is about 7:1 longer than the radial thickness of the retainer.

4. A coupling assembly comprising a coupling connecting a vehicle exhaust tail pipe to an exhaust conduit for removing vehicle exhaust fumes,
   said coupling comprising a cylindrical housing having an inlet at a front end and an outlet at a rear end, said rear end being connected to the exhaust conduit,
   a bristle assembly removably mounted within the housing adjacent the front end, and removable means securing the bristle assembly in the housing,
   said bristle assembly comprising an annular retainer and a multitude of resilient bristles extending radially inwardly from the retainer towards a longitudinal axis of the housing and terminating at a position spaced from said longitudinal axis to provide a central aperture,
   said bristles projecting radially inwardly from the retainer by a distance in the range from about 4:1 to about 8:1 longer than the radial thickness of the retainer, the front end of the housing having been pushed over the vehicle exhaust tail pipe to cause the tail pipe to bend the bristles rearwardly into engagement with the tail pipe to produce an effective gas seal between the front end of the coupling and the tail pipe.

5. A coupling assembly according to claim 4 wherein the annular retainer has an outer diameter in the range from about 3.5 to about 4".

6. A coupling assembly according to claim 5 wherein the bristles project radially inwardly from the retainer by distance which is about 7:1 longer than the radial thickness of the retainer.

7. A coupling assembly according to claim 4 wherein at least some of the bristles have free end portions bent rearwardly by the vehicle exhaust tail pipe a sufficient amount to cause said free end portions to extend in a rearward direction parallel to the length of the tail pipe.

* * * * *